US012005440B2

(12) United States Patent
Pang

(10) Patent No.: US 12,005,440 B2
(45) Date of Patent: Jun. 11, 2024

(54) MICROFLUIDIC CHIP HAVING GROUNDING TRACE AND MANUFACTURING METHOD THEREOF, AND MICROFLUIDIC DEVICE

(71) Applicants: BEIJING BOE SENSOR TECHNOLOGY CO., LTD., Beijing (CN); BOE TECHNOLOGY GROUP CO., LTD., Beijing (CN)

(72) Inventor: Fengchun Pang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 575 days.

(21) Appl. No.: 17/280,945

(22) PCT Filed: Sep. 22, 2020

(86) PCT No.: PCT/CN2020/116732
§ 371 (c)(1),
(2) Date: Mar. 29, 2021

(87) PCT Pub. No.: WO2021/093460
PCT Pub. Date: May 20, 2021

(65) Prior Publication Data

US 2022/0305489 A1 Sep. 29, 2022

(30) Foreign Application Priority Data

Nov. 13, 2019 (CN) ........................ 201911106075.7

(51) Int. Cl.
*B01L 3/00* (2006.01)
*G09G 3/34* (2006.01)

(52) U.S. Cl.
CPC .......... *B01L 3/502707* (2013.01); *G09G 3/34* (2013.01)

(58) Field of Classification Search
None
See application file for complete search history.

(56) References Cited

U.S. PATENT DOCUMENTS 8,173,000 B1 5/2012 Hadwen et al.
2008/0153152 A1 6/2008 Wakabayashi et al.
(Continued)

FOREIGN PATENT DOCUMENTS

CN 1912609 A 2/2007
CN 102629613 A 8/2012
(Continued)

*Primary Examiner* — Nduka E Ojeh
(74) *Attorney, Agent, or Firm* — The Webb Law Firm

(57) ABSTRACT

Provided are a microfluidic chip and a manufacturing method thereof, and a microfluidic device. The microfluidic chip comprises a first substrate structure comprising a plurality of pin areas comprising a first and a second pin area, a detection area, and a grounding trace. The detection area comprises a plurality of first scan lines extending along a first direction, each of which being connected to the first pin area through a corresponding first scan trace; a plurality of first data lines extending along a second direction, each of which being connected to the second pin area through a corresponding first data trace; a plurality of detection units, each of which comprising a first switching transistor connected to a corresponding first scan line and data line, a driving electrode, and a first hydrophobic layer. The grounding trace is connected to at least one detection unit and one of the pin areas.

20 Claims, 11 Drawing Sheets

(56) References Cited

U.S. PATENT DOCUMENTS

| | | | |
|---|---|---|---|
| 2011/0220505 A1 | 9/2011 | Wang et al. | |
| 2012/0083046 A1 | 4/2012 | Watson et al. | |
| 2013/0143350 A1 | 6/2013 | Xu et al. | |
| 2017/0154945 A1 | 6/2017 | Shin et al. | |
| 2019/0097076 A1* | 3/2019 | Cao | H10K 59/60 |
| 2019/0111433 A1* | 4/2019 | French | G09G 3/348 |
| 2019/0204262 A1 | 7/2019 | Pang et al. | |
| 2020/0019279 A1 | 1/2020 | Xie et al. | |
| 2020/0061608 A1 | 2/2020 | Liu et al. | |
| 2020/0108387 A1 | 4/2020 | Dong et al. | |
| 2020/0316590 A1 | 10/2020 | Xi et al. | |
| 2021/0114034 A1* | 4/2021 | Lin | B01L 3/502792 |
| 2021/0366899 A1 | 11/2021 | Liu et al. | |

FOREIGN PATENT DOCUMENTS

| | | | |
|---|---|---|---|
| CN | 103531640 | A | 1/2014 |
| CN | 106773399 | A | 5/2017 |
| CN | 106847085 | A | 6/2017 |
| CN | 106932990 | A | 7/2017 |
| CN | 107145266 | A | 9/2017 |
| CN | 107527595 | A | 12/2017 |
| CN | 107754962 | A | 3/2018 |
| CN | 108226261 | A | 6/2018 |
| CN | 108717939 | A | 10/2018 |
| CN | 108816299 | A | 11/2018 |
| CN | 108855266 | A | 11/2018 |
| CN | 109174219 | A | 1/2019 |
| CN | 109261234 | A | 1/2019 |
| CN | 109894168 | A | 6/2019 |
| CN | 110264961 | A | 9/2019 |
| JP | 2008-151771 | A | 7/2008 |
| WO | 2019047702 | A1 | 3/2019 |

* cited by examiner

MICROFLUIDIC CHIP HAVING GROUNDING TRACE AND MANUFACTURING METHOD THEREOF, AND MICROFLUIDIC DEVICE

CROSS-REFERENCE TO RELATED APPLICATIONS

The present application is a U.S. National Stage Application under 35 U.S.C. § 371 of International Patent Application No. PCT/CN2020/116732, filed on Sep. 22, 2020, which claims priority to China Patent Application No. 201911106075.7 filed on Nov. 13, 2019, the disclosures of both of which are incorporated by reference herein in their entirety.

TECHNICAL FIELD

The present disclosure relates to a microfluidic chip and a manufacturing method thereof, and a microfluidic device.

BACKGROUND

By utilizing the microfluidic technology, basic operation functions such as reaction, separation, or detection of droplets during biological, chemical, or medical analysis process can be integrated on one chip, thus a total analysis process can be automatically completed.

With the advantages such as low cost, short detection time and high sensitivity, the microfluidic technology demonstrates a significant prospect in the fields such as biology, chemistry, and medicine.

SUMMARY

According to one aspect of the embodiments of the present disclosure, a microfluidic chip is provided. The microfluidic chip comprises comprising a first substrate structure, the first substrate structure comprising: a plurality of pin areas comprising a first pin area and a second pin area; a detection area comprising: a plurality of first scan lines extending along a first direction, wherein each first scan line of the plurality of first scan lines is connected to the first pin area through a first scan trace corresponding to each first scan line; a plurality of first data lines extending along a second direction different from the first direction, wherein each first data line of plurality of first data lines is connected to the second pin area through a first data trace corresponding to each first data line; and a plurality of detection units, each of which comprising a first switching transistor, a driving electrode connected to the first switching transistor, and a first hydrophobic layer located above the driving electrode, wherein the first switching transistor is connected to a first scan line of the plurality of first scan lines corresponding to the first switching transistor and connected to a first data line of the plurality of first data lines corresponding to the first switching transistor; and a grounding trace surrounding the detection area, connected to at least one of the plurality of detection units, and connected to one of the plurality of pin areas.

In some embodiments, the first substrate structure further comprises: an electrostatic discharge protection device arranged to surround the grounding trace.

In some embodiments, the electrostatic discharge protection device comprises a plurality of thin film transistors, each thin film transistor of the plurality of thin film transistors is connected to a first scan trace corresponding to each thin film transistor or connected to a first data trace corresponding to each thin film transistor.

In some embodiments, the first switching transistor comprises a first active layer; and each of the plurality of detection units comprises a light shielding layer connected to the grounding trace and located above the first active layer, and an orthographic projection of the light shielding layer on the first substrate at least partially overlaps with an orthographic projection of the first active layer on the first substrate.

In some embodiments, the first switching transistor comprises: a first gate located on the first substrate, a first insulating layer located on the first substrate and covering the first gate, the first active layer located on the first insulating layer, and a first source and a first drain which are connected to the first active layer; and each of the plurality of detection units further comprises: a second insulating layer covering the first switching transistor, a third insulating layer located on the second insulating layer, wherein the light shielding layer is located between the second insulating layer and the third insulating layer, the driving electrode located on the third insulating layer, wherein the driving electrode is connected to the first source through a via hole penetrating the third insulating layer and the second insulating layer, a dielectric layer located on the drive electrode, and a first hydrophobic layer located on the dielectric layer.

In some embodiments, the orthographic projection of the first active layer on the first substrate is within the orthographic projection of the light shielding layer on the first substrate.

In some embodiments, the plurality of pin areas further comprises a third pin area and a fourth pin area; the detection area further comprises: a plurality of second scan lines extending along the first direction, wherein each second scan line of the plurality of second scan lines is connected to the third pin area through a second scan trace corresponding to each second scan line, and a plurality of second data lines extending along the second direction, wherein each second data line of the plurality of second data lines is connected to the fourth pin area through a second data trace corresponding to each second data line; and each of the plurality of detection units further comprises a second switching transistor and a photosensitive element connected to the second switching transistor, wherein the second switching transistor is connected to a second scan line of the plurality of second scan lines corresponding to the second switching transistor, and connected to a second data line of the plurality of second data lines corresponding to the second switching transistor.

In some embodiments, the first switching transistor comprises a first active layer, and the second switching transistor comprises a second active layer; and each of the plurality of detection units comprises a first light shielding layer and a second light shielding layer which are spaced apart from each other and connected to the grounding trace, wherein: the first light shielding layer is located above the first active layer, and an orthographic projection of the first light shielding layer on the first substrate at least partially overlaps with an orthographic projection of the first active layer on the first substrate, and the second light shielding layer is located above the second active layer, and an orthographic projection of the second light shielding layer on the first substrate at least partially overlaps with an orthographic projection of the second active layer on the first substrate.

In some embodiments, the first switching transistor comprises a first gate located on a first substrate, a first insulating layer located on the first substrate and covering the first gate, the first active layer located on the first insulating layer, and a first source and a first drain which are connected to the first active layer. The second switching transistor comprises a second gate located on the first substrate, a second insulating layer located on the first substrate and covering the second gate, a second active layer located on the second insulating layer, and a second source and a second drain which are connected to the second active layer. Each of the plurality of detection units further comprises: a third insulating layer covering the first switching transistor and the second switching transistor; a first electrode and a second electrode which are located on the third insulating layer and spaced apart from each other, wherein the first electrode is connected to the first source through a first via hole penetrating the third insulating layer, and the second electrode is connected to the second source through a second via hole penetrating the third insulating layer; the photosensitive element located on the second electrode; a third electrode located on the photosensitive element; a fourth insulating layer located on the third insulating layer and covering the first electrode, the second electrode and the third electrode; a fifth insulating layer located on the fourth insulating layer; the first light shielding layer and the second light shielding layer which are located on the fifth insulating layer; a sixth insulating layer located on the first light shielding layer and the second light shielding layer; the driving electrode located on the sixth insulating layer, wherein the driving electrode is connected to the first light shielding layer through a fifth via hole penetrating the sixth insulating layer; and a dielectric layer located on the sixth insulating layer and the driving electrode, wherein the first hydrophobic layer is located on the dielectric layer.

In some embodiments, the orthographic projection of the first active layer on the first substrate is within the orthographic projection of the first light shielding layer on the first substrate; and the orthographic projection of the second active layer on the first substrate is within the orthographic projection of the second light shielding layer on the first substrate.

In some embodiments, the first substrate structure further comprises: a fluid reservoir area configured to store droplets and connected to one of the plurality of pin areas; and a plurality of guide electrodes arranged at intervals between the fluid reservoir area and the detection area, wherein each of the plurality of guide electrodes is connected to one of the plurality of pin areas.

In some embodiments, the microfluidic chip further comprises: a second substrate structure opposite to the first substrate structure, engaged to the first substrate structure through an engagement member, and comprising: a second substrate, and a common electrode arranged on one side of the second substrate close to the first substrate structure. The first substrate structure further comprises a conductive member connected to the grounding trace and in contact with the common electrode.

In some embodiments, the second substrate structure further comprises: a second hydrophobic layer arranged on one side of the common electrode away from the second substrate, wherein the second hydrophobic layer is provided with a hole, and the conductive member passes through the hole to be in contact with the common electrode.

In some embodiments, the second substrate structure is provided with at least one first hole penetrating the second substrate structure, and an orthographic projection of each of the at least one first hole on the first substrate is located within an orthographic projection of the detection area on the first substrate.

In some embodiments, the first substrate structure comprises a fluid reservoir area configured to store droplets and connected to one of the plurality of pin areas; and the second substrate structure is provided with a second hole penetrating the second substrate structure, and an orthographic projection of the second hole on the first substrate at least partially overlaps with an orthographic projection of the fluid reservoir area on the first substrate.

In some embodiments, the conductive member comprises conductive silver paste.

According to another aspect of the embodiments of the present disclosure, a microfluidic device is provided. The microfluidic device comprises the microfluidic chip according to any one of the above embodiments.

According to a further aspect of the embodiments of the present disclosure, a manufacturing method of a microfluidic chip is provided. The manufacturing method comprises forming a first substrate structure, wherein forming the first substrate structure comprises: forming a plurality of pin areas which comprises a first pin area and a second pin area; forming a detection area comprising: a plurality of first scan lines extending along a first direction, wherein each first scan line of the plurality of first scan lines is connected to the first pin area through a first scan trace corresponding to each first scan line, a plurality of first data lines extending along a second direction different from the first direction, wherein each first data line of plurality of first data lines is connected to the second pin area through a first data trace corresponding to each first data line, and a plurality of detection units, each of which comprising a first switching transistor, a driving electrode connected to the first switching transistor, and a first hydrophobic layer located above the driving electrode, wherein the first switching transistor is connected to a first scan line of the plurality of first scan lines corresponding to the first switching transistor and connected to a first data line of the plurality of first data lines corresponding to the first switching transistor; and forming a grounding trace surrounding the detection area, connected to at least one of the plurality of detection units and connected to one of the plurality of pin areas.

In some embodiments, the manufacturing method further comprises: forming a second substrate structure, comprising: providing a second substrate and forming a common electrode on one side of the second substrate; and engaging the second substrate structure to the first substrate structure through an engagement member, such that the second substrate structure is opposite to the first substrate structure.

In some embodiments, forming the second substrate structure further comprises forming a second hydrophobic layer on one side of the common electrode away from the second substrate, wherein the second hydrophobic layer is provided with a hole; and forming the first substrate structure further comprises forming a conductive member connected to the grounding trace, wherein after the second substrate structure is engaged to the first substrate structure, the conductive member passes through the hole to be in contact with the common electrode.

Other features, aspects and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
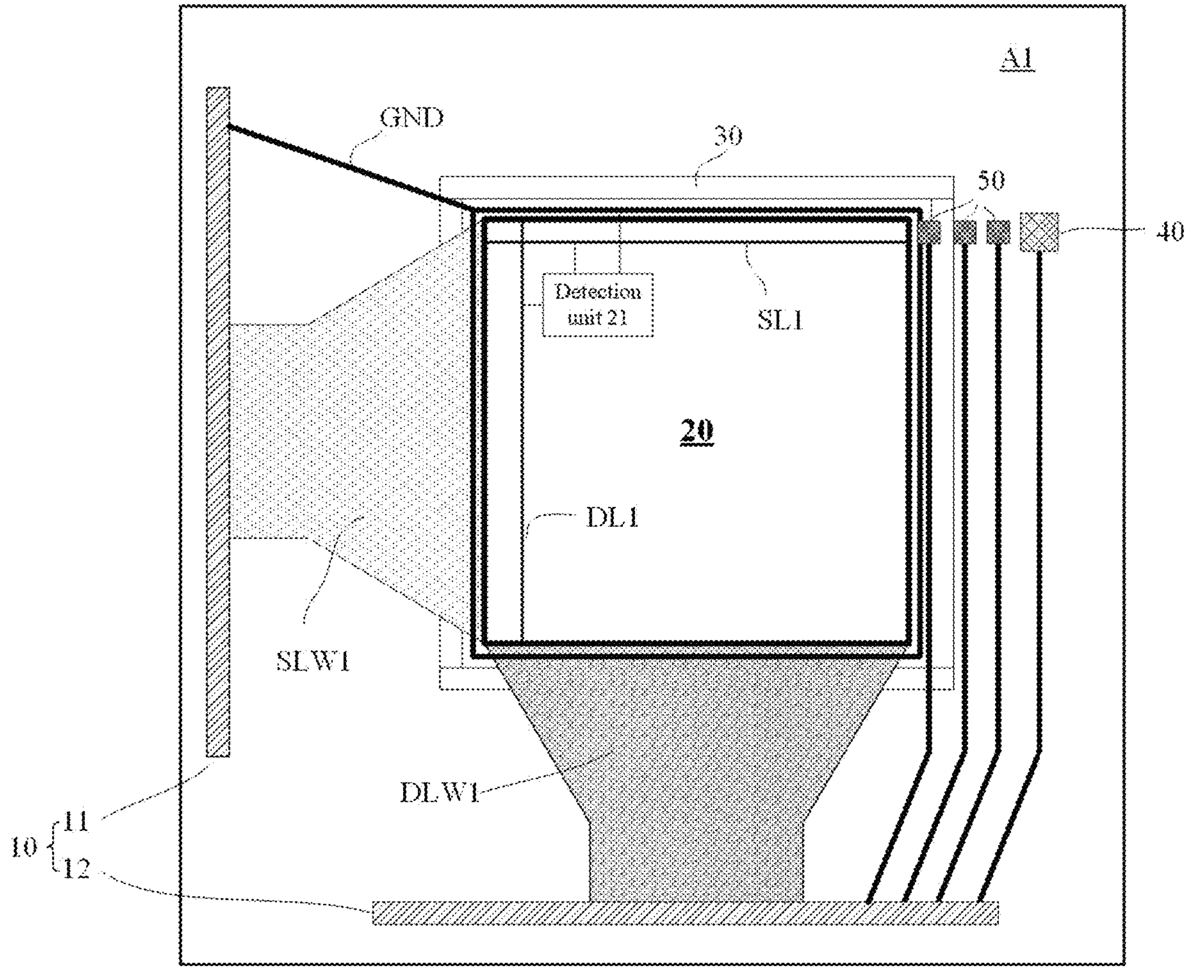
FIG. 1 is a schematic structure view showing the microfluidic chip according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

FIG. 1 is a schematic structure view showing the microfluidic chip according to an embodiment of the present disclosure.

As shown in FIG. 1, the microfluidic chip comprises a first substrate structure A1. The first substrate structure A1 comprises a plurality of pin areas 10, a detection area 20 and a grounding trace GND surrounding the detection area 20.

The plurality of pin areas 10 may comprise, for example, a first pin area 11 and a second pin area 12. The first pin area 11 and the second pin area 12 may comprise one or more pins, respectively.

The detection area 20 comprises a plurality of first scan lines SL1, a plurality of first data lines DL1, and a plurality of detection units 21. The plurality of detection units 21 may be arranged in a matrix, for example, and may comprise M rows and N columns of detection units 21. It should be understood that, FIG. 1 only schematically shows one first scan line SL1, one first data line DL1, and one detection unit 21.

The plurality of first scan lines SL1 extends along a first direction. Here, the first direction may be, for example, a row direction in which the plurality of detection units 21 are arranged. Each first scan line SL1 is connected to the first pin area 11 through a first scan trace SLW1 corresponding to each first scan line SL1. It should be understood that, different first scan lines SL1 correspond to different first scan lines SLW1, and different first scan lines SLW1 are connected to different pins in the first pin area 11.

The plurality of first data lines DL1 extends along a second direction different from the first direction. Here, the second direction is, for example, perpendicular to the first direction, and may be, for example, a column direction in which the plurality of detection units 21 are arranged. Each first data line DL1 is connected to the second pin area 12 through a first data trace DLW1 corresponding to each first data line DL1. It should be understood that, different first data lines DL1 correspond to different first data lines DLW1, and different first data lines DLW1 are connected to different pins in the second pin area 12.

Each detection unit 21 may comprise a first switching transistor 211 and a driving electrode 212 connected to the first switching transistor 211. Each detection unit 21 further comprises a first hydrophobic layer 216 located above the driving electrode 212 (which will be introduced in detail later in conjunction with FIG. 3). A voltage may be applied to the driving electrode 212, by the first switching transistor 211, to control the movement, separation, fusion, or generation of droplets on the driving electrode 212.

Figure 2:
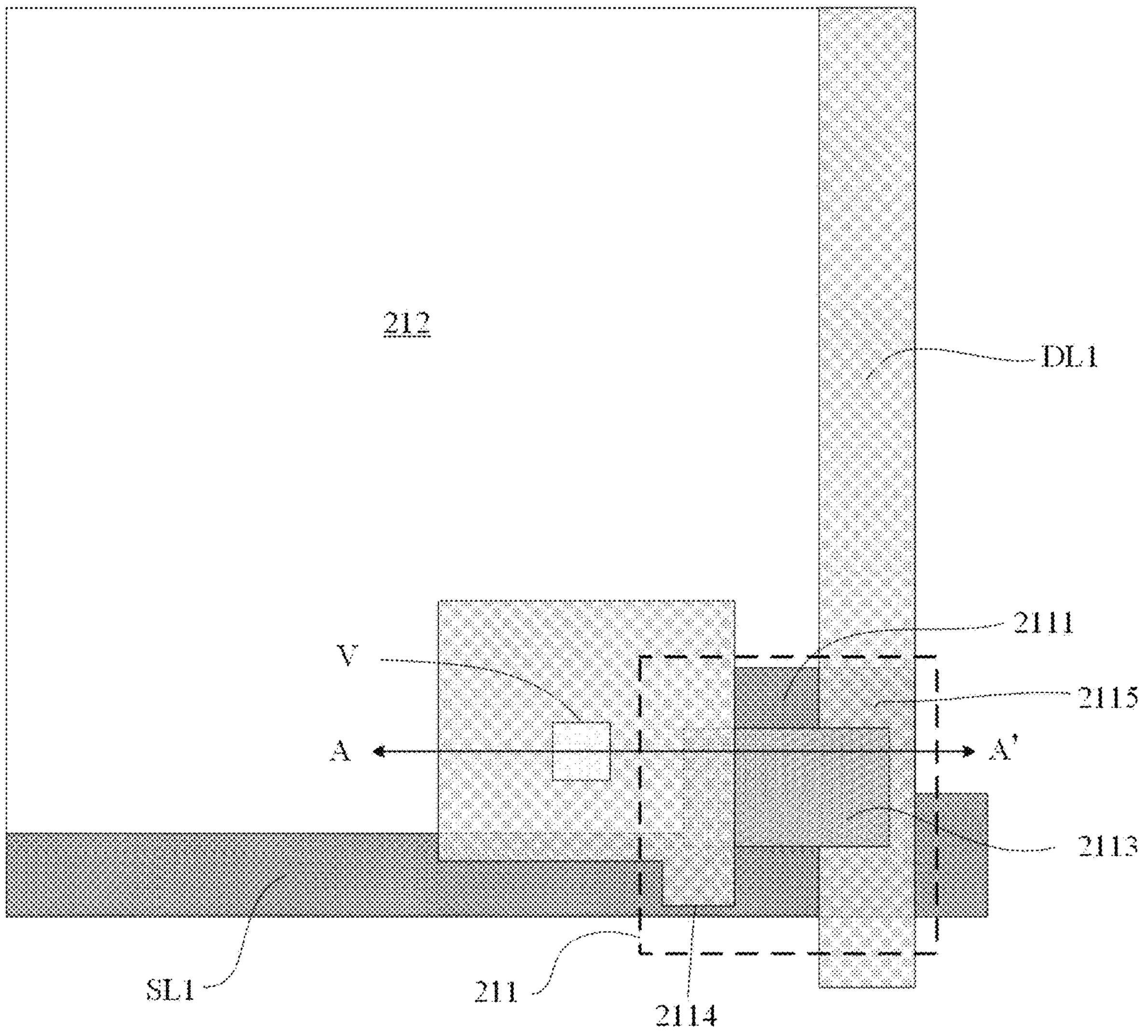
FIG. 2 is a schematic view showing the layout of the detection unit according to an embodiment of the present disclosure.

FIG. 2 is a schematic view showing the layout of the detection unit according to an embodiment of the present disclosure.

As shown in FIG. 2, the first switching transistor 211 is connected to a first scan trace SL1 corresponding to the first switching transistor 211 and connected to a first data trace DL1 corresponding to the first switching transistor 211. For example, gates of the first switching transistors 211 in the detection units 21 in the same row may be connected to a same first scan line SL1, and drains of the first switching transistors 211 in the detection units 21 in the same column may be connected to a same first data line DL1.

Referring to FIG. 1, the grounding trace GND is connected to at least one detection unit 21 and connected to one of the plurality of pin areas 10. For example, the grounding trace GND may be connected to each detection unit 21, for example, to a light shielding layer in each detection unit 21. The grounding trace GND may be connected to the first pin area 11 (as shown in FIG. 1) or may be connected to the second pin area 12.

In the above embodiments, the first substrate structure A1 in the microfluidic chip comprises a plurality of pin areas 10, a detection area 20, and a grounding trace GND. The grounding trace GND is arranged to surround the detection area 20. On the one hand, it is convenient for the detection unit 21 to be connected to the grounding trace GND; and on the other hand, it is beneficial to reduce a parasitic capacitance of the detection unit 21.

In some embodiments, referring to FIG. 1, the first substrate structure A1 may further comprise an electrostatic discharge protection device 30 arranged to surround the grounding trace GND. In some embodiments, the electrostatic discharge protection device 30 may comprise a plurality of thin film transistors. Each thin film transistor is connected to a first scan trace SLW1 corresponding to each thin film transistor or connected to a first data trace DLW1 corresponding to each thin film transistor. For example, one of the source and the drain of a thin film transistor is connected to a first scan trace SLW1 corresponding to this thin film transistor, and the other is connected to the grounding trace GND. For another example, one of the source and drain of a thin film transistor is connected to a first data trace DLW1 corresponding to this thin film transistor, and the other is connected to the grounding trace GND. The electrostatic discharge protection device 30 may prevent a high voltage on the first scan line SL1 from burning out the first scan trace SLW1, and may prevent a high voltage on the first data line DL1 from burning out the first data trace DLW1.

In some embodiments, referring to FIG. 1, the first substrate structure A1 may further comprise a fluid reservoir area 40 configured to store droplets. Here, the fluid reservoir area 40 may be connected to one of the plurality of pin areas 10, for example, to the second pin area 12. The fluid reservoir area 40 may comprise, for example, an insulating layer and a metal layer on the insulating layer. For example, various insulating layers in the detection area 20 may extend to the fluid reservoir area 40. The material of the metal layer in the fluid reservoir area 40 may be the same as the material of a certain layer in the detection area 20, for example, the same as the material of the source, the drain or the gate of the first switching transistor 211. It should be noted that, the fluid reservoir area 40 may be arranged at any position at a periphery of the detection area 20, with no limitation to the amount.

In some embodiments, referring to FIG. 1, the first substrate structure A1 may further comprise a plurality of guide electrodes 50. The plurality of guide electrodes 50 is arranged at intervals between the fluid reservoir area 40 and the detection area 20. Each guide electrode 50 is connected to one of the plurality of pin areas 10, for example, to the second pin area 12. By controlling a voltage of each guide electrode 50, large droplets in the fluid reservoir area 40 may be separated into small droplets and guided to the detection area 20.

Figure 3:
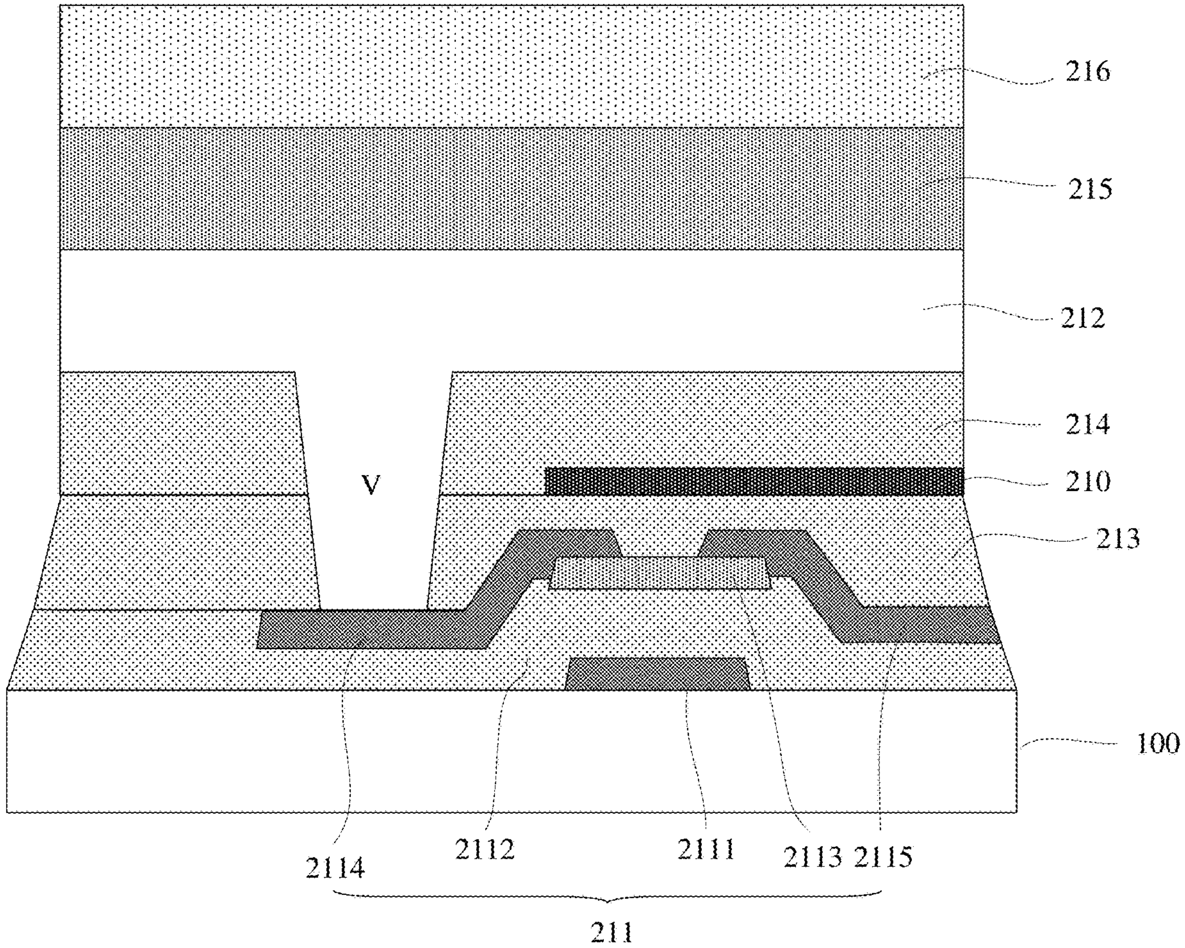
FIG. 3 is a schematic cross-sectional view taken along A-A' shown in FIG. 2 according to an embodiment of the present disclosure.

FIG. 3 is a schematic cross-sectional view taken along A-A' shown in FIG. 2 according to an embodiment of the present disclosure.

As shown in FIG. 3, the first switching transistor 211 comprises a first active layer 2113. In some embodiments, the material of the first active layer 2113 may comprise amorphous silicon, low-temperature polysilicon, or an oxide semiconductor such as indium gallium zinc oxide (IGZO), or the like.

Each detection unit 21 comprises a light shielding layer 210 connected to the grounding trace GND and located above the first active layer 2113. In some implementations, the material of the light shielding layer 210 may comprise a metal such as Mo, Al, Cu, Ag, Ti or Ni, or the like. Here, the orthographic projection of the light shielding layer 210 on the first substrate 100 at least partially overlaps with the orthographic projection of the first active layer 2113 on the first substrate 100. For example, the orthographic projection of the first active layer 2113 on the first substrate 100 may be within the orthographic projection of the light shielding layer 210 on the first substrate 100.

The light shielding layer 210 can reduce an adverse effect of ambient light on the first active layer 2113, to reduce a photocurrent of the first switching transistor 211. In addition, since the light shielding layer 215 is connected to the grounding trace GND, a parasitic capacitance between the light shielding layer 210 and other metal layers can be reduced, and an adverse effect of induced charges of the light shielding layer 210 on the detection unit 21 can be reduced or avoided.

In some embodiments, as shown in FIG. 3, the first switching transistor 211 comprises a first gate 2111 located on the first substrate 100, a first insulating layer 2112 located on the first substrate 100 and covering the first gate 2111, a first active layer 2113 located on the first insulating layer 2112, and a first source 2114 and a first drain 2115 which are connected to (for example, in contact with) the first active layer 2113. In some implementations, the material of at least one of the first gate 2111, the first source 2114 or the first drain 2115 may comprise a metal such as Mo, Al, Cu, Ag, Ti or Ni. In some implementations, the material of the first insulating layer 2112 may comprise an inorganic material such as silicon oxide (for example, $SiO_2$), silicon nitride (e.g., SiNx), $Ta_2O_5$ or $Al_2O_3$, or may comprise an organic material such as resin, polydimethyl siloxane, polyimide or parylene.

Each detection unit 21 further comprises a second insulating layer 213 covering the first switching transistor 211 and a third insulating layer 214 located on the second insulating layer 213. The light shielding layer 210 is located between the second insulating layer 213 and the third insulating layer 214. In some implementations, the material of at least one of the second insulating layer 213 and the third insulating layer 214 may comprise an inorganic material such as silicon oxide (e.g., $SiO_2$), silicon nitride (e.g., SiNx), $Ta_2O_5$ or $Al_2O_3$, or may further comprise an organic material such as resin, polydimethylsiloxane, polyimide or parylene.

Each detection unit 21 further comprises a driving electrode 212 located on the third insulating layer 214, a dielectric layer 215 located on the driving electrode 212, and a first hydrophobic layer 216 located on the dielectric layer 215. Here, the first hydrophobic layer 216 facilitates the movement of droplets. The driving electrode 212 is connected to the first source 2114 through a via hole V penetrating the third insulating layer 214 and the second insulating layer 213. In some implementations, the material of the driving electrode 212 may comprise Mo, Al, Cu, Ag, Ti, Ni, indium tin oxide (ITO), indium zinc oxide (IZO), and the like. In some implementations, the material of the dielectric layer 215 may comprise an inorganic material such as silicon oxide (such as $SiO_2$), silicon nitride (such as SiNx), $Ta_2O_5$ or $Al_2O_3$, or may comprise organic materials such as resin, polydimethylsiloxane, polyimide or parylene. In some implementations, the material of the first hydrophobic layer 216 may comprise a fluoropolymer or the like.

Figure 4:
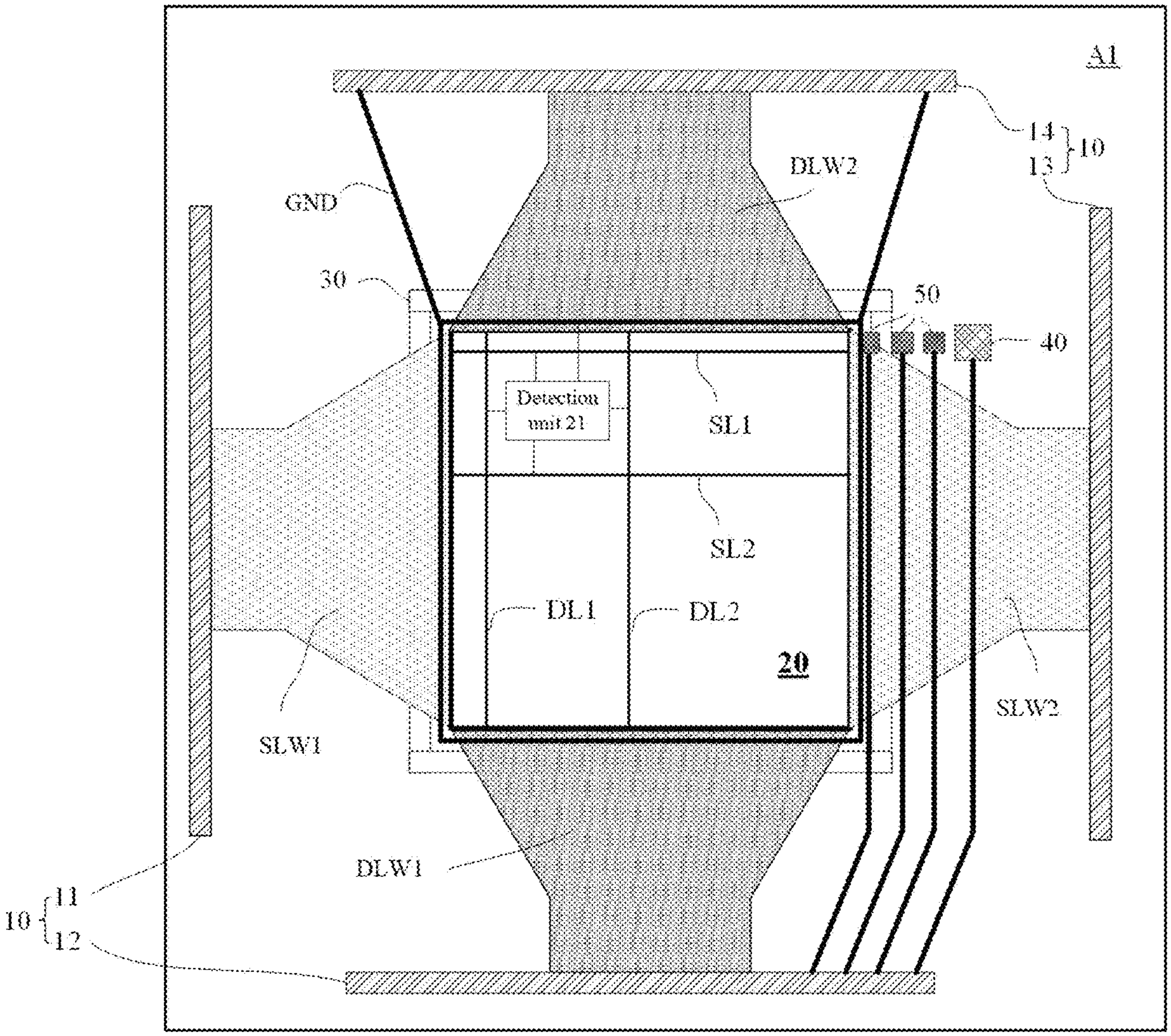
FIG. 4 is a schematic structure view showing the microfluidic chip according to another embodiment of the present disclosure.

FIG. 4 is a schematic structure view showing the microfluidic chip according to another embodiment of the present disclosure. Only the differences between the microfluidic chips shown in FIG. 4 and FIG. 1 will be mainly introduced below, and for other similarities, reference may be made to the above description.

In FIG. 4, the plurality of pin areas 10 further comprises a third pin area 13 and a fourth pin area 14, other than the first pin area 11 and the second pin area 12. Here, the third pin area 13 and the fourth pin area 14 may comprise one or more pins, respectively.

Other than the plurality of first scan lines SL1 and the plurality of first data lines DL1, the detection area 20 further comprises a plurality of second scan lines SL2 and a plurality of second data lines DL2. It should be understood that, FIG. 1 only schematically shows one second scan line SL2 and one second data line DL2.

The plurality of second scan lines SL2 extends along the first direction. Each second scan line SL2 is connected to the third pin area 13 through a second scan trace SLW2 corresponding to each second scan line SL2. It should be understood that, different second scan lines SL2 correspond to different second scan traces SLW2, and different second scan traces SLW2 are connected to different pins in the third pin area 13.

The plurality of second data lines DL2 extends along the second direction. Each second data line DL2 is connected to the fourth pin area 14 through a second data trace DLW2 corresponding to each second data line DL2. It should be understood that, different second data lines DL2 correspond to different second data traces DLW2, and different second data traces DLW2 are connected to different pins in the fourth pin area 14.

Other than the first switching transistor 211 and the driving electrode 212, each detection unit 21 further comprises a second switching transistor 217 and a photosensitive element 218 connected to the second switching transistor 217. The photosensitive element 218 may comprise a photosensitive sensor, such as a photodiode. The photodiode may comprise, for example, a PIN photodiode. In some implementations, the photosensitive element 218 may comprise a first semiconductor layer, a second semiconductor layer, and an intrinsic semiconductor layer between the first semiconductor layer and the second semiconductor layer. One of the first semiconductor layer and the second semiconductor layer is an N-type semiconductor layer, and the other is a P-type semiconductor layer.

Figure 5:
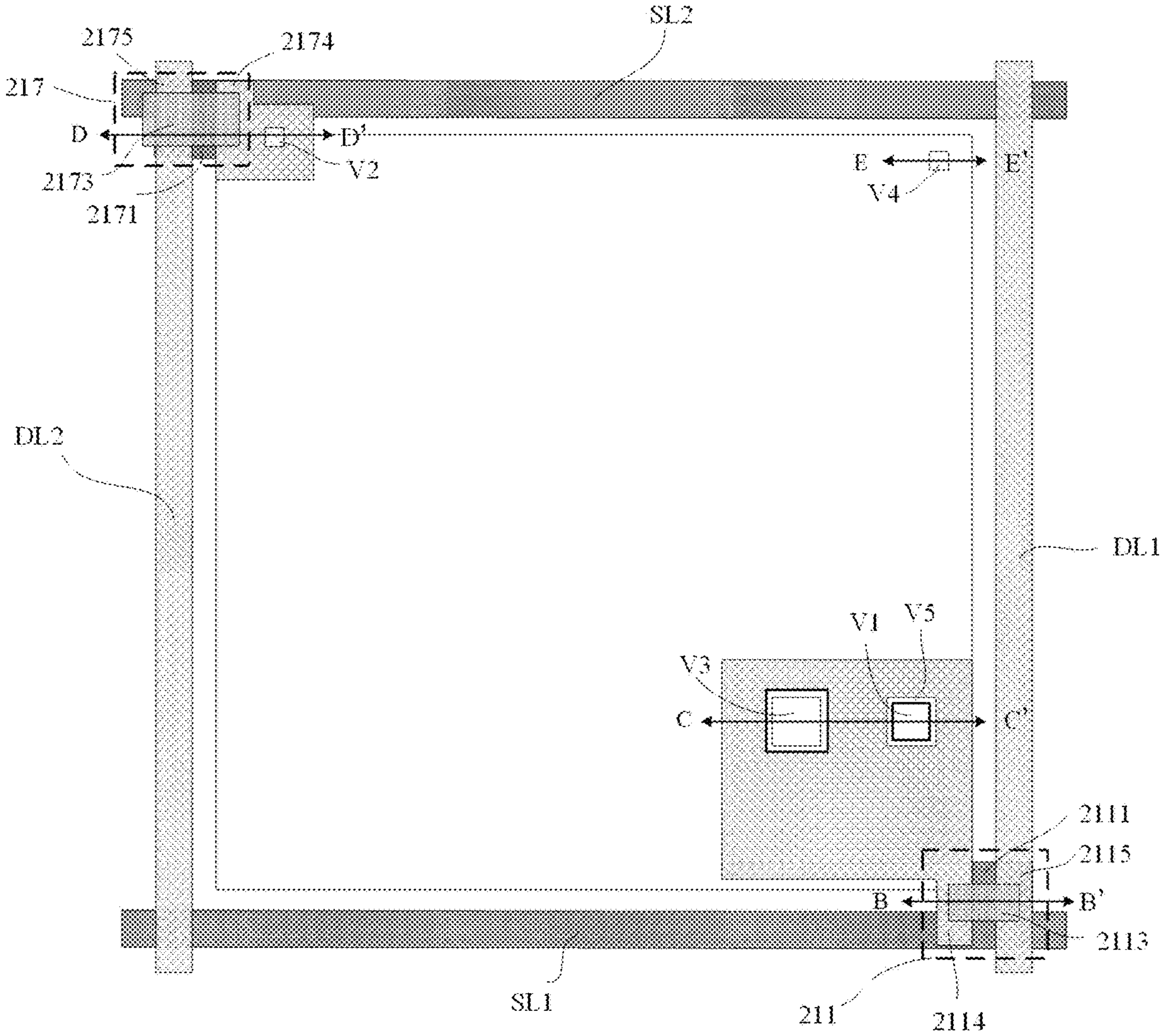
FIG. 5 is a schematic view showing the layout of the detection unit according to another embodiment of the present disclosure.

FIG. 5 is a schematic view showing the layout of the detection unit according to another embodiment of the present disclosure.

As shown in FIG. 5, the second switching transistor 217 is connected to a second scan trace SL2 corresponding to the second switching transistor 217 and connected to a second data line DL2 corresponding to the second switching transistor 217. For example, gates of the second switching transistors 217 in the detection units 21 in the same row may be connected to a same second scan line SL2, and drains of the second switching transistors 217 in the detection units 21 in the same column may be connected to a same second data line DL1.

In the above embodiments, the first substrate structure A1 in the microfluidic chip further comprises a third pin area 13, a fourth pin area 14, a plurality of second scan lines SL2 and a plurality of second data lines DL2. The detection unit 21 further comprises a second switching transistor 217 and a photosensitive element 218. The photosensitive element 218 may convert an optical signal into an electrical signal. By controlling the second switching transistor 217 to be turned on, an electrical signal of the photosensitive element 218 can be read, and information such as the position and the concentration of droplets can be further obtained according to the electrical signal.

Figure 6:
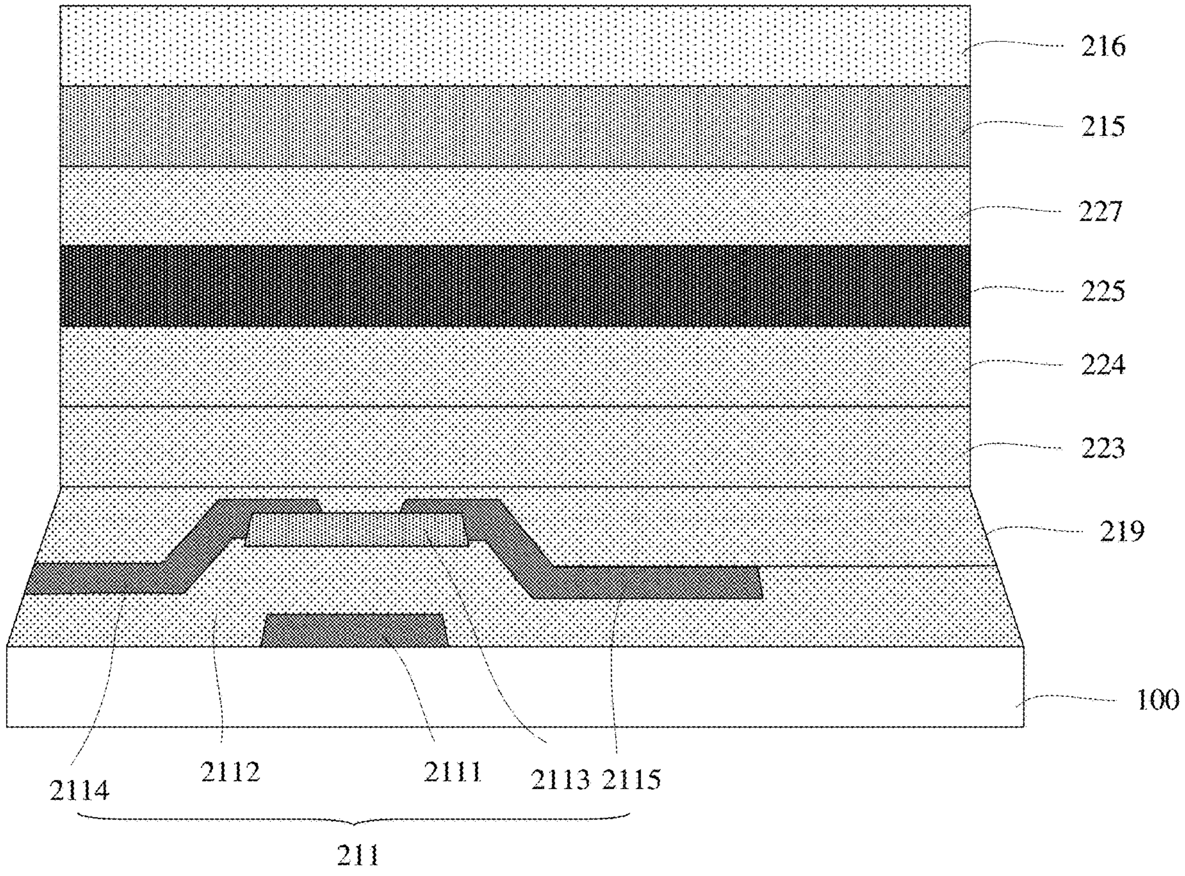
FIG. 6 is a schematic cross-sectional view taken along B-B' shown in FIG. 5 according to an embodiment of the present disclosure.
Figure 7:
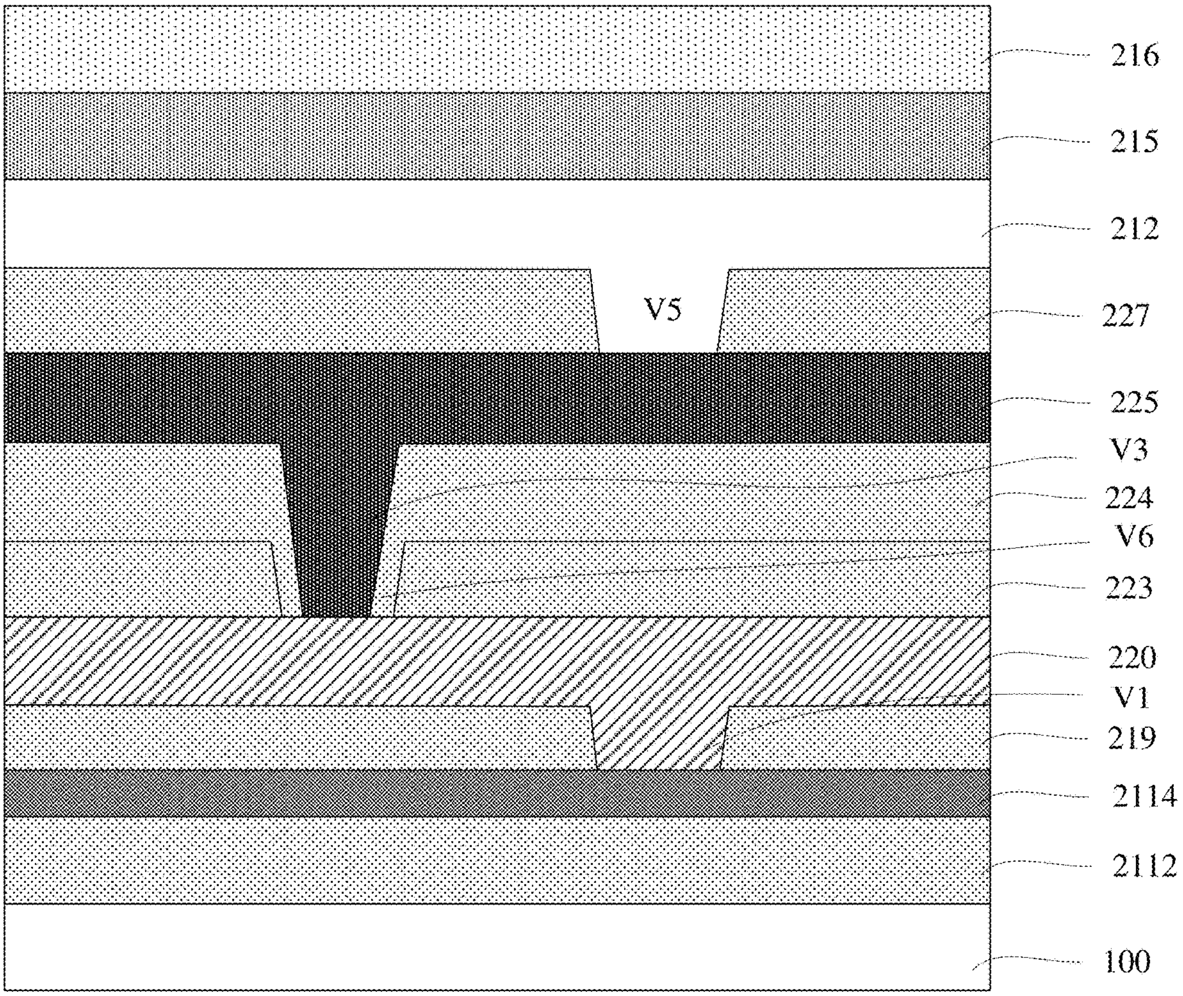
FIG. 7 is a schematic cross-sectional view taken along C-C' shown in FIG. 5 according to an embodiment of the present disclosure.
Figure 8:
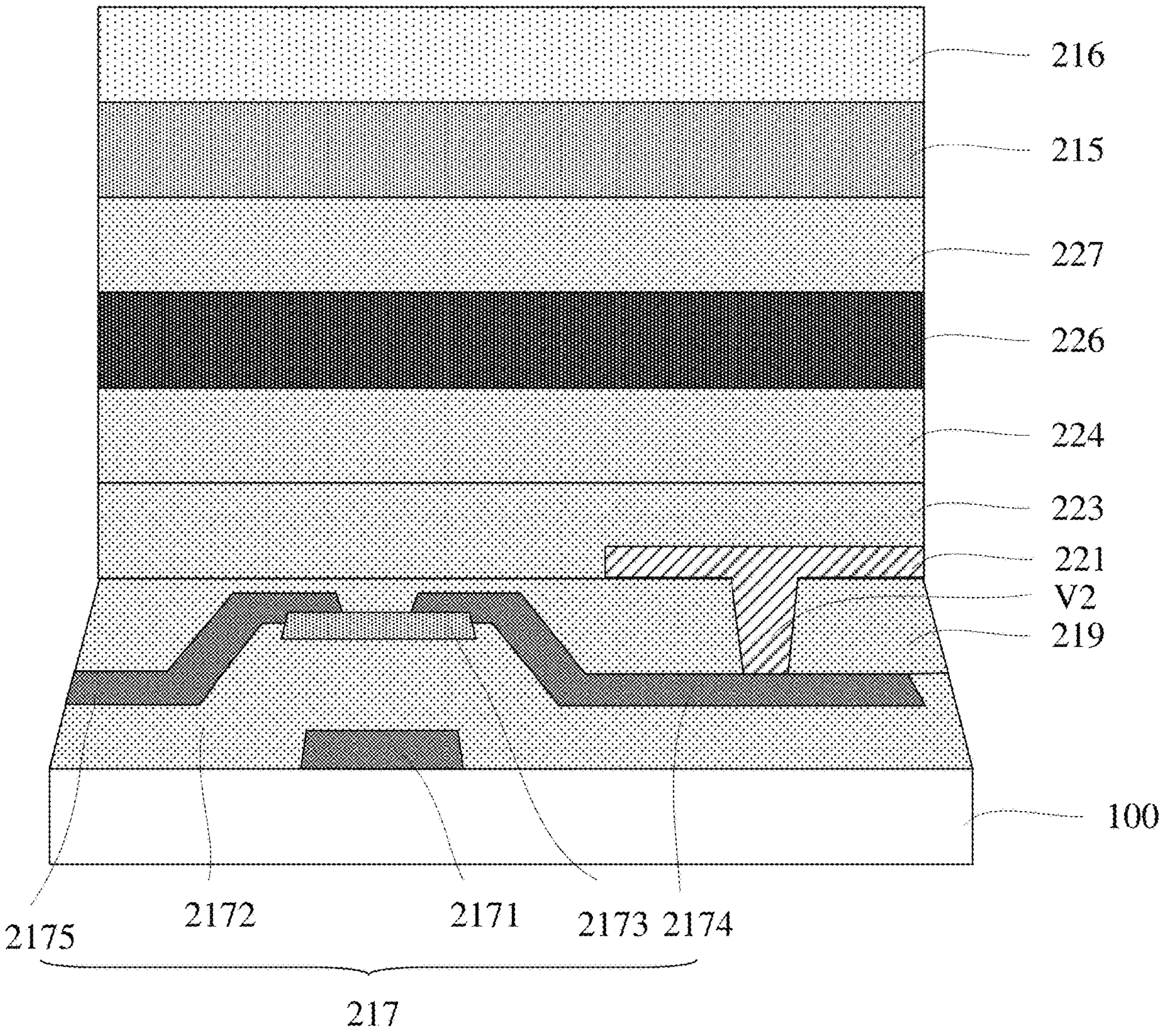
FIG. 8 is a schematic cross-sectional view taken along D-D' shown in FIG. 5 according to an embodiment of the present disclosure.
Figure 9:
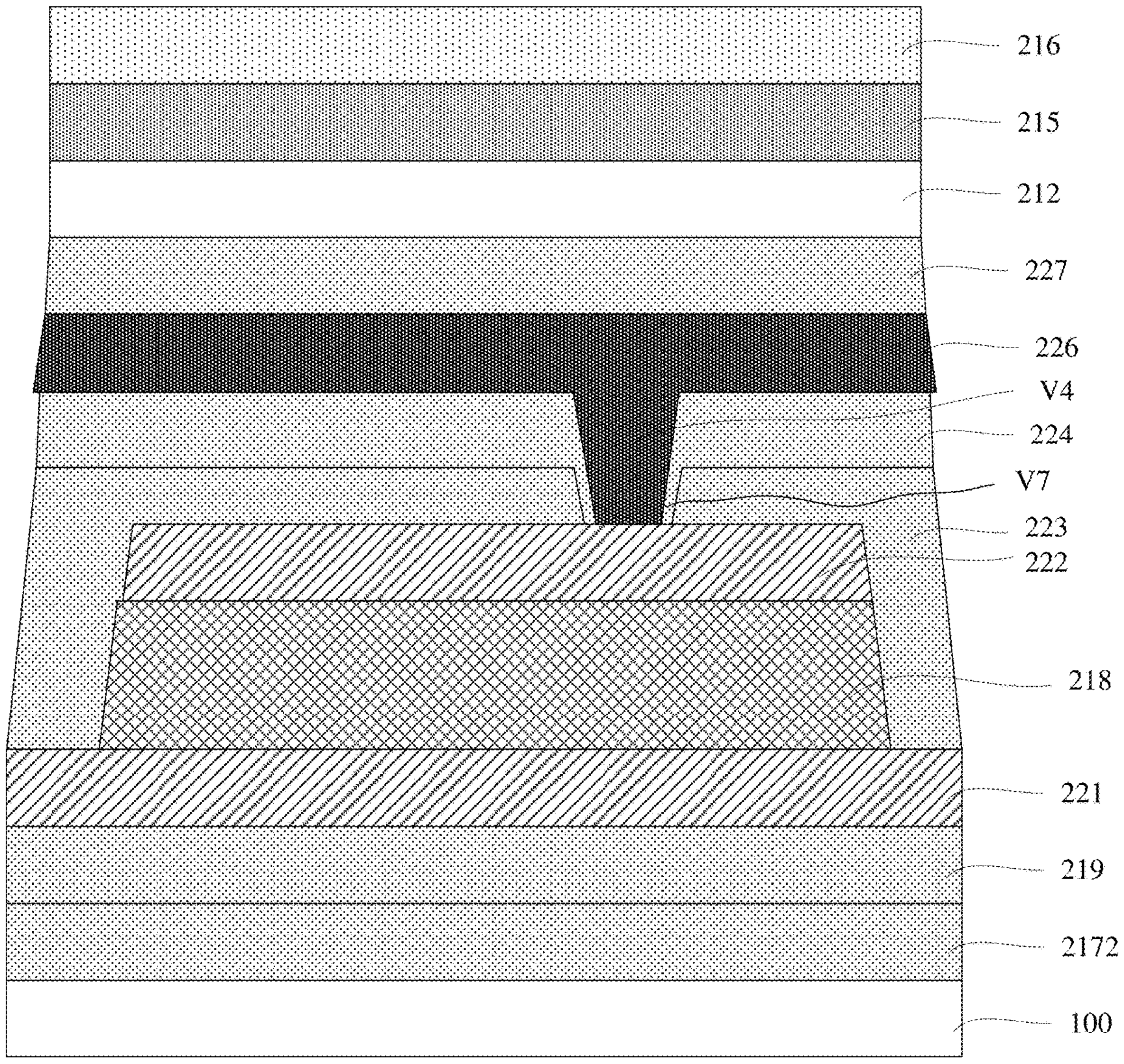
FIG. 9 is a schematic cross-sectional view taken along E-E' shown in FIG. 5 according to an embodiment of the present disclosure.

FIG. 6 is a schematic cross-sectional view taken along B-B' shown in FIG. 5 according to an embodiment of the present disclosure. FIG. 7 is a schematic cross-sectional view taken along C-C' shown in FIG. 5 according to an embodiment of the present disclosure. FIG. 8 is a schematic cross-sectional view taken along D-D' shown in FIG. 5 according to an embodiment of the present disclosure. FIG. 9 is a schematic cross-sectional view taken along E-E' shown in FIG. 5 according to an embodiment of the present disclosure.

The structure of the detection unit 21 according to an embodiment of the present disclosure will be described below in conjunction with FIGS. 6-9.

As shown in FIGS. 6 and 8, the first switching transistor 211 comprises a first active layer 2113, and the second switching transistor 217 comprises a second active layer 2173. Each detection unit 21 comprises a first light shielding layer 225 and a second light shielding layer 226 spaced apart from each other and both connected to the grounding trace GND. In some implementations, the material of at least one of the first active layer 2113 and the second active layer 2173 may comprise amorphous silicon, low temperature polysilicon, or an oxide semiconductor such as indium gallium zinc oxide (IGZO), or the like. In some implementations, the material of the first light shielding layer 225 and the second light shielding layer 226 may comprise a metal such as Mo, Al, Cu, Ag, Ti or Ni.

The first light shielding layer 225 is located above the first active layer 2113, and the orthographic projection of the first light shielding layer 225 on the first substrate 100 at least partially overlaps with the orthographic projection of the first active layer 2113 on the first substrate 100. For example, the orthographic projection of the first active layer 2113 on the first substrate 100 may be within the orthographic projection of the first light shielding layer 225 on the first substrate 100.

The second light shielding layer 226 is located above the second active layer 2173, and the orthographic projection of the second light shielding layer 226 on the first substrate 100 at least partially overlaps with the orthographic projection of the second active layer 2173 on the first substrate 100. For example, the orthographic projection of the second active layer 2173 on the first substrate 100 may be within the orthographic projection of the second light shielding layer 226 on the first substrate 100.

The first light shielding layer 225 can reduce an adverse effect of ambient light on the first active layer 2113, to reduce a photocurrent of the first switching transistor 211. The second light shielding layer 226 can reduce an adverse effect of ambient light on the second active layer 2173, so as to reduce a photocurrent of the second switching transistor 217. In addition, since the first light shielding layer 225 and the second light shielding layer 226 are both connected to the grounding trace GND, a parasitic capacitance between the first light shielding layer 225 and other metal layers and a parasitic capacitance between the second light shielding layer 226 and other metal layers can be reduced, and an adverse effect of the induced charges of the first light shielding layer 225 and the second light shielding layer 226 on the detection unit 21 can be reduced or avoided.

In some embodiments, as shown in FIGS. 6 and 7, the first switching transistor 211 comprises a first gate 2111 located on the first substrate 100, a first insulating layer 2112 located on the first substrate 100 and covering the first gate 2111, a first active layer 2113 located on the first insulating layer 2112, a first source 2114 and a first drain 2115 which are both connected to (for example, in contact with) the first active layer 2113.

In some embodiments, as shown in FIGS. 8 and 9, the second switching transistor 217 comprises a second gate 2171 located on the first substrate 100, a second insulating layer 2172 located on the first substrate 100 and covering the second gate 2171, a second active layer 2173 located on the second insulating layer 2172, and a second source 2174 and a second drain 2175 which are both connected to (for example, in contact with) the second active layer 2173. In some embodiments, the second insulating layer 2172 and the first insulating layer 2112 may be integrally arranged.

In some implementations, the material of at least one of the first gate 2111, the first source 2114, the first drain 2115, the second gate 2171, the second source 2174, or the second drain 2175 may comprise a metal such as Mo, Al, Cu, Ag, Ti or Ni.

Referring to FIGS. 6-9, each detection unit 21 further comprises a third insulating layer 219, a first electrode 220, a second electrode 221, a photosensitive element 218 located on the second electrode 221, a third electrode 222 located on the photosensitive element 218, a fourth insulating layer 223 located on the third insulating layer 219, a fifth insulating layer 224 located on the fourth insulating layer 223, a first light shielding layer 225, a second light shielding layer 226, a sixth insulating layer 227 located on the first light shielding layer 225 and the second light shielding layer 226, a driving electrode 212 located on the sixth insulating layer 227, a dielectric layer 215 located on the sixth insulating layer 227 and located on the driving electrode 212, and a hydrophobic layer 216 located on the dielectric layer 215.

The third insulating layer 219 covers the first switching transistor 211 and the second switching transistor 217. The first electrode 220 (see FIGS. 6 and 7) and the second electrode 221 (see FIGS. 8 and 9) are located on the third insulating layer 219 and are spaced apart from each other. Referring to FIG. 7, the first electrode 220 is connected to the first source 2114 through a first via hole V1 penetrating the third insulating layer 219. Referring to FIG. 9, the second electrode 221 is connected to the second source 2174 through a second via hole V2 penetrating the third insulating layer 219. The material of at least one of the first electrode 220 or the second electrode 221 may comprise a metal such as Mo, Al, Cu, Ag, Ti or Ni.

As shown in FIGS. 6-9, the fourth insulating layer 223 covers the first electrode 220, the second electrode 221, and the third electrode 222.

The first light shielding layer 225 is located on the fifth insulating layer 224, and connected to the grounding trace GND. As shown in FIG. 7, the first light shielding layer 225 may be connected to the first electrode 220 through a third via hole V3 penetrating the fifth insulating layer 224 and the fourth insulating layer 223. In some implementations, the fifth insulating layer 224 may be connected to the first electrode 220 through a sixth via hole V6 penetrating the fourth insulating layer 223. Here, the orthographic projection of the third via hole V3 on the first substrate 100 is within the orthographic projection of the sixth via hole V6 on the first substrate 100.

The second light shielding layer 226 and the first light shielding layer 225, which are spaced apart from each other, are located on the fifth insulating layer 224 and connected to the grounding trace GND. As shown in FIG. 9, the second light shielding layer 226 may be connected to the third electrode 222 through a fourth via hole V4 penetrating the fifth insulating layer 224 and the fourth insulating layer 223. In some implementations, the fifth insulating layer 224 may be connected to the third electrode 222 through a seventh via hole V7 penetrating the fourth insulating layer 223. Here, the orthographic projection of the fourth via hole V4 on the first substrate 100 is within the orthographic projection of the seventh via hole V7 on the first substrate 100.

As shown in FIG. 7, the driving electrode 212 may be connected to the first light shielding layer 225 through a fifth via hole V5 penetrating the sixth insulating layer 227.

In some implementations, the material of at least one of the first insulating layer 2112, the second insulating layer 2172, the third insulating layer 219, the fourth insulating layer 223, the fifth insulating layer 224 or the sixth insulating layer 227 described above may comprise an inorganic material such as silicon oxide (e.g., SiO2), silicon nitride (e.g., SiNx), Ta2O5, Al2O3, or may comprise an organic material such as resin, polydimethylsiloxane, polyimide or parylene.

Figure 10:
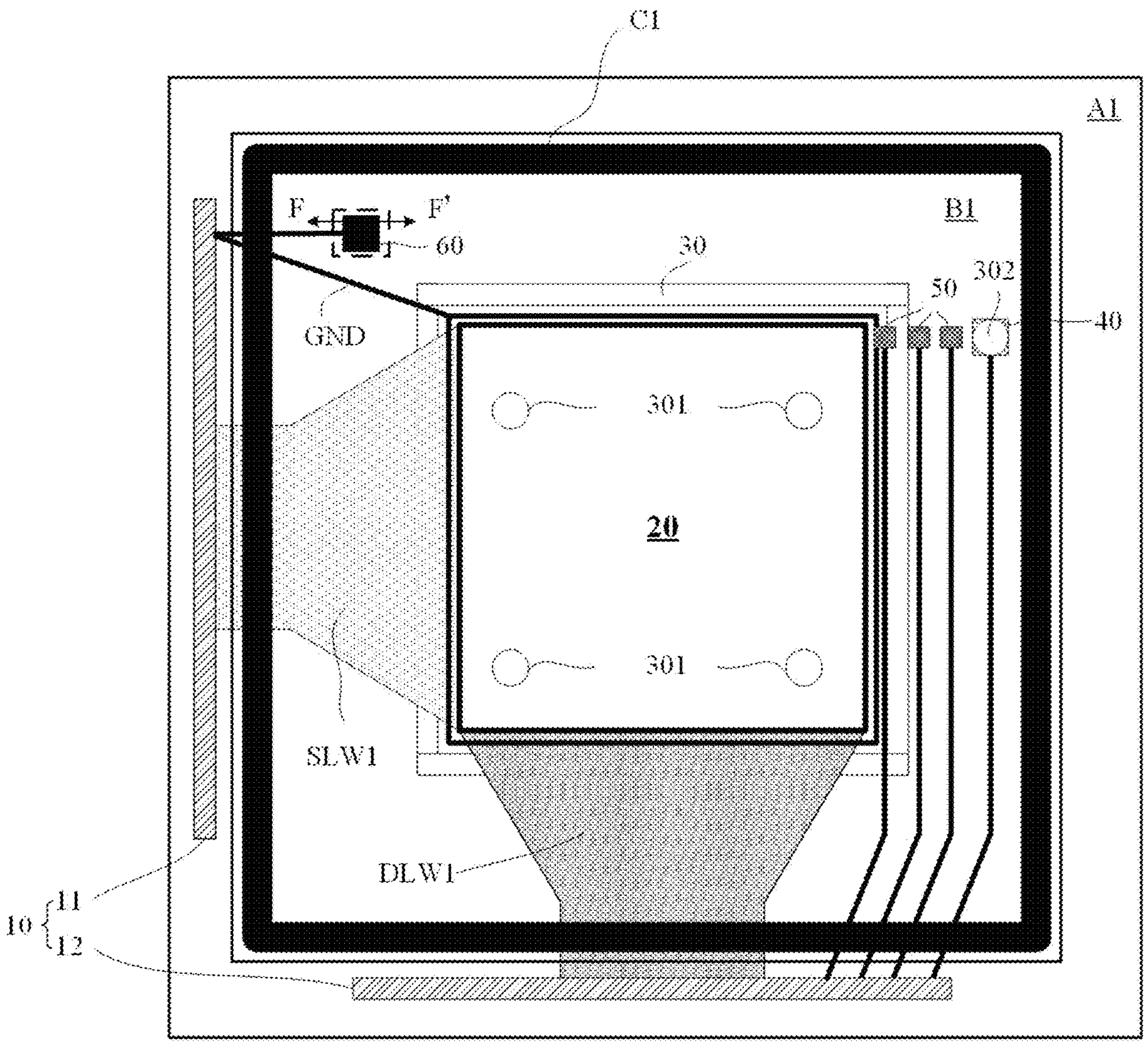
FIG. 10 is a schematic structure view showing the microfluidic chip according to a further embodiment of the present disclosure.

FIG. 10 is a schematic structure view showing the microfluidic chip according to a further embodiment of the present disclosure.

Compared with the microfluidic chip shown in FIG. 1, the microfluidic chip shown in FIG. 10 further comprises a second substrate structure B1. It should be noted that, for the sake of clarity, the microfluidic chip shown in FIG. 10 shows the detection area 20 in the first substrate structure A1 in a simplified manner.

Figure 11:
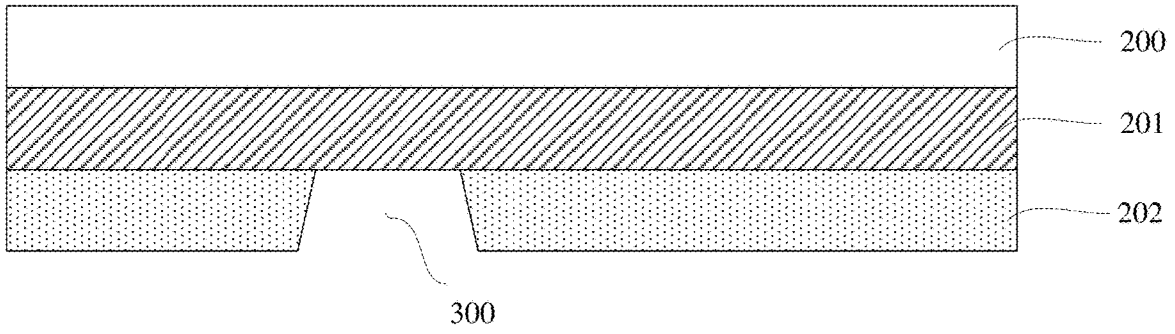
FIG. 11 is a schematic cross-sectional view taken along F-F' shown in FIG. 10 according to an embodiment of the present disclosure.

FIG. 11 is a schematic cross-sectional view taken along F-F' shown in FIG. 10 according to an embodiment of the present disclosure.

As shown in FIG. 11, the second substrate structure B1 comprises a second substrate 200 and a common electrode 201 arranged on one side of the second substrate 200 close to the first substrate structure A1. In some implementations, the material of the common electrode 201 may comprise indium tin oxide (ITO) or indium zinc oxide (IZO).

Referring to FIG. 10, the second substrate structure B1 is opposite to the first substrate structure A1 and engaged to the first substrate structure A1 through an engagement member C1. For example, the second substrate structure B1 may be adhered to the first substrate structure A1 by a sealant. It should be understood that, a space for accommodating droplets is formed between the second substrate structure B1 and the first substrate structure A1.

The first substrate structure A1 further comprises a conductive member 60 connected to the grounding trace GND and in contact with the common electrode 201. In other words, the common electrode 201 is connected to the grounding trace GND via the conductive member 60. In some implementations, the conductive member 60 may comprise conductive silver paint.

In the above embodiments, the common electrode 201 in the second substrate structure B1 is connected to the grounding trace GND. By controlling a voltage of the driving electrode 212 in the detection unit 21 of the first substrate structure A1, droplets between the first substrate structure A1 and the second substrate structure B1 can be driven to move.

In some embodiments, referring to FIG. 11, the second substrate structure B1 may further comprise a second hydrophobic layer 202 arranged on one side of the common electrode 201 away from the second substrate 200. The second hydrophobic layer 202 is more favorable for the movement of droplets. Here, the second hydrophobic layer 202 is provided with a hole 300. The conductive member 60 shown in FIG. 10 may pass through the hole 300 to be in contact with the common electrode 201. In some implementations, the material of the second hydrophobic layer 202 may comprise a fluoropolymer or the like.

In some embodiments, the second substrate structure B2 is provided with at least one first hole 301 penetrating the second substrate structure B2. The orthographic projection of each first hole 301 on the first substrate 100 is located within the orthographic projection of the detection area 20 on the first substrate 100. The first hole 301 may comprise, for example, one or more of a vent hole, a liquid inlet hole and an oil inlet hole. For example, the first hole 301 may comprise two vent holes, one liquid inlet hole and one oil inlet hole. The vent hole is configured such that the gas produced after reaction of droplets leaves a space between the second substrate structure B1 and the first substrate structure A1 through the vent hole. The liquid inlet hole is configured to apply a reaction fluid. The oil inlet hole is configured to apply oil (e.g., silicone oil) that facilitates the flow of the reaction fluid.

In some embodiments, the first substrate structure A1 comprises a fluid reservoir area 40 configured to store droplets. The fluid reservoir area 40 is connected to one of the plurality of pin areas 10, for example, to the second pin area 12. Correspondingly, the second substrate structure B2 may be provided with a second hole 302 penetrating the second substrate structure B2. The second hole 302 is configured to apply a reaction fluid to the fluid reservoir area 40. The orthographic projection of the second hole 302 on the first substrate 100 at least partially overlaps with the orthographic projection of the fluid reservoir area 40 in the first substrate structure A1 on the first substrate 100. For example, the orthographic projection of the second hole 302 on the first substrate 100 may be within the orthographic projection of the fluid reservoir area 40 on the first substrate 100.

Figure 12:
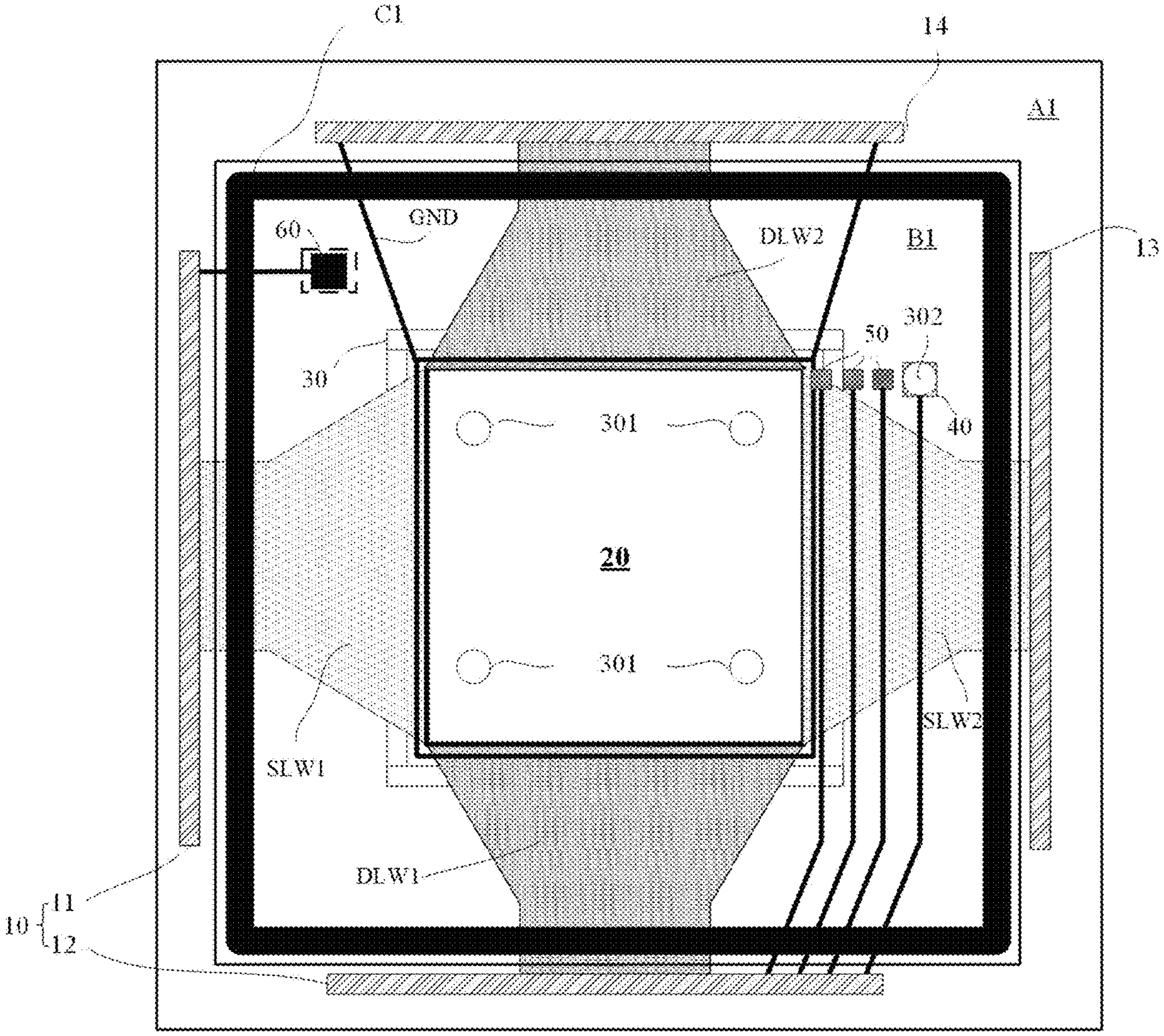
FIG. 12 is a schematic structure view showing the microfluidic chip according to still another embodiment of the present disclosure.

FIG. 12 is a schematic structure view showing the microfluidic chip according to still another embodiment of the present disclosure.

Compared with the microfluidic chip shown in FIG. 4, the microfluidic chip shown in FIG. 10 further comprises a second substrate structure B1. It should be noted that, for the sake of clarity, the microfluidic chip shown in FIG. 12 shows the detection area 20 in the first substrate structure A1 in a simplified manner. In addition, the second substrate structure B1 shown in FIG. 12 is the same as the second substrate structure B1 shown in FIG. 10 and will not be described in detail here.

It should be understood that, the microfluidic chip provided by various embodiments of the present disclosure is an active digital microfluidic chip.

In the embodiments of the present disclosure, a microfluidic device is also provided. The microfluidic device may comprise the microfluidic chip according to any one of the above embodiments. In some embodiments, the microfluidic device may be a miniaturized total analysis system.

In the embodiments of the present disclosure, a manufacturing method of a microfluidic chip is also provided. The manufacturing method of a microfluidic chip comprises a step of forming a first substrate structure.

The process of forming the first substrate structure will be introduced below.

The step of forming the first substrate structure comprises forming a plurality of pin areas. The plurality of pin areas comprises a first pin area and a second pin area.

The step of forming the first substrate structure further comprises forming a detection area. The detection area comprises a plurality of first scan lines extending along a first direction. Each first scan line is connected to the first pin area through a first scan trace corresponding to each first scan line. The detection area further comprises a plurality of first data lines extending along a second direction different from the first direction. Each first data line is connected to the second pin area through a first data trace corresponding to each first data line. The detection area further comprises a plurality of detection units. Each detection unit comprises a first switching transistor and a driving electrode connected to the first switching transistor. The first switching transistor is connected to a first scan trace corresponding to the first switching transistor and connected to a first data line corresponding to the first switching transistor.

The step of forming the first substrate structure further comprises forming a grounding trace surrounding the detection area. Here, the grounding trace is connected to at least one detection unit and connected to one of the plurality of pin areas.

The first substrate structure formed in the above embodiments comprises a plurality of pin areas, a detection area, and a grounding trace. The grounding trace is arranged to surround the detection area. On one hand, it is convenient for the detection unit to be connected to the grounding trace; and on the other hand, it is beneficial to reduce a parasitic capacitance of the detection unit.

In some embodiments, the manufacturing method of the microfluidic chip further comprises the following steps: a second substrate structure is formed; and the second substrate structure is engaged to the first substrate structure through an engagement member, such that the second substrate structure is opposite to the first substrate structure. For example, the second substrate structure may be formed in the following manner: a second substrate is provided; and then a common electrode on one side of the second substrate is formed.

In some embodiments, during the process of forming a second substrate structure, a second hydrophobic layer provided with a hole may also be formed on one side of the common electrode away from the second substrate. In addition, during the process of forming the first substrate structure, a conductive element connected to the grounding trace may also be formed. After the second substrate structure is engaged to the first substrate structure, the conductive member passes through the hole of the second hydrophobic layer to be in contact with the common electrode.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A microfluidic chip comprising a first substrate structure, the first substrate structure comprising:
- a plurality of pin areas, comprising a first pin area and a second pin area;
- a detection area, comprising:
  - a plurality of first scan lines extending along a first direction, wherein each first scan line of the plurality of first scan lines is connected to the first pin area through a first scan trace corresponding to each first scan line,
  - a plurality of first data lines extending along a second direction different from the first direction, wherein each first data line of plurality of first data lines is connected to the second pin area through a first data trace corresponding to each first data line, and
  - a plurality of detection units, each of which comprising a first switching transistor, a driving electrode connected to the first switching transistor, and a first hydrophobic layer located above the driving electrode, wherein the first switching transistor is connected to a first scan line of the plurality of first scan lines corresponding to the first switching transistor and connected to a first data line of the plurality of first data lines corresponding to the first switching transistor; and
- a grounding trace surrounding the detection area, connected to at least one of the plurality of detection units, and connected to one of the plurality of pin areas.

2. The microfluidic chip according to claim 1, wherein the first substrate structure further comprises:
- an electrostatic discharge protection device arranged to surround the grounding trace.

3. The microfluidic chip according to claim 2, wherein the electrostatic discharge protection device comprises a plurality of thin film transistors, each thin film transistor of the plurality of thin film transistors is connected to a first scan trace corresponding to each thin film transistor or connected to a first data trace corresponding to each thin film transistor.

4. The microfluidic chip according to claim 1, wherein:
- the first switching transistor comprises a first active layer; and
- each of the plurality of detection units comprises a light shielding layer connected to the grounding trace and located above the first active layer, and an orthographic projection of the light shielding layer on the first substrate at least partially overlaps with an orthographic projection of the first active layer on the first substrate.

5. The microfluidic chip according to claim 4, wherein:
- the first switching transistor comprises:
  - a first gate located on the first substrate,
  - a first insulating layer located on the first substrate and covering the first gate,
  - the first active layer located on the first insulating layer, and
  - a first source and a first drain which are connected to the first active layer; and
- each of the plurality of detection units further comprises:
  - a second insulating layer covering the first switching transistor,
  - a third insulating layer located on the second insulating layer, wherein the light shielding layer is located between the second insulating layer and the third insulating layer,
  - the driving electrode located on the third insulating layer, wherein the driving electrode is connected to the first source through a via hole penetrating the third insulating layer and the second insulating layer,
  - a dielectric layer located on the drive electrode, and
  - the first hydrophobic layer located on the dielectric layer.

6. The microfluidic chip according to claim 4, wherein the orthographic projection of the first active layer on the first substrate is within the orthographic projection of the light shielding layer on the first substrate.

7. The microfluidic chip according to claim 1, wherein:
- the plurality of pin areas further comprises a third pin area and a fourth pin area;
- the detection area further comprises:
  - a plurality of second scan lines extending along the first direction, wherein each second scan line of the plurality of second scan lines is connected to the third pin area through a second scan trace corresponding to each second scan line, and
  - a plurality of second data lines extending along the second direction, wherein each second data line of the plurality of second data lines is connected to the fourth pin area through a second data trace corresponding to each second data line; and
- each of the plurality of detection units further comprises a second switching transistor and a photosensitive element connected to the second switching transistor, wherein the second switching transistor is connected to a second scan line of the plurality of second scan lines corresponding to the second switching transistor, and connected to a second data line of the plurality of second data lines corresponding to the second switching transistor.

8. The microfluidic chip according to claim 7, wherein:
- the first switching transistor comprises a first active layer, and the second switching transistor comprises a second active layer; and each of the plurality of detection units comprises a first light shielding layer and a second light shielding layer which are spaced apart from each other and connected to the grounding trace, wherein:

the first light shielding layer is located above the first active layer, and an orthographic projection of the first light shielding layer on the first substrate at least partially overlaps with an orthographic projection of the first active layer on the first substrate, and the second light shielding layer is located above the second active layer, and an orthographic projection of the second light shielding layer on the first substrate at least partially overlaps with an orthographic projection of the second active layer on the first substrate.

9. The microfluidic chip according to claim 8, wherein:

the first switching transistor comprises a first gate located on a first substrate, a first insulating layer located on the first substrate and covering the first gate, the first active layer located on the first insulating layer, and a first source and a first drain which are connected to the first active layer;

the second switching transistor comprises a second gate located on the first substrate, a second insulating layer located on the first substrate and covering the second gate, a second active layer located on the second insulating layer, and a second source and a second drain which are connected to the second active layer; and each of the plurality of detection units further comprises:

a third insulating layer covering the first switching transistor and the second switching transistor, a first electrode and a second electrode which are located on the third insulating layer and spaced apart from each other, wherein the first electrode is connected to the first source through a first via hole penetrating the third insulating layer, and the second electrode is connected to the second source through a second via hole penetrating the third insulating layer, the photosensitive element located on the second electrode, a third electrode located on the photosensitive element, a fourth insulating layer located on the third insulating layer and covering the first electrode, the second electrode and the third electrode, a fifth insulating layer located on the fourth insulating layer, the first light shielding layer and the second light shielding layer which are located on the fifth insulating layer, a sixth insulating layer located on the first light shielding layer and the second light shielding layer, the driving electrode located on the sixth insulating layer, wherein the driving electrode is connected to the first light shielding layer through a fifth via hole penetrating the sixth insulating layer, and a dielectric layer located on the sixth insulating layer and the driving electrode, wherein the first hydrophobic layer is located on the dielectric layer.

10. The microfluidic chip according to claim 8, wherein:

the orthographic projection of the first active layer on the first substrate is within the orthographic projection of the first light shielding layer on the first substrate; and the orthographic projection of the second active layer on the first substrate is within the orthographic projection of the second light shielding layer on the first substrate.

11. The microfluidic chip according to claim 1, wherein the first substrate structure further comprises:

a fluid reservoir area configured to store droplets and connected to one of the plurality of pin areas; and a plurality of guide electrodes arranged at intervals between the fluid reservoir area and the detection area, wherein each of the plurality of guide electrodes is connected to one of the plurality of pin areas.

12. The microfluidic chip according to claim 1, further comprising:

a second substrate structure opposite to the first substrate structure, engaged to the first substrate structure through an engagement member, and comprising:

a second substrate, and a common electrode arranged on one side of the second substrate close to the first substrate structure, wherein the first substrate structure further comprises a conductive member connected to the grounding trace and in contact with the common electrode.

13. The microfluidic chip according to claim 12, wherein the second substrate structure further comprises:

a second hydrophobic layer arranged on one side of the common electrode away from the second substrate, wherein the second hydrophobic layer is provided with a hole, and the conductive member passes through the hole to be in contact with the common electrode.

14. The microfluidic chip according to claim 12, wherein the second substrate structure is provided with at least one first hole penetrating the second substrate structure, and an orthographic projection of each of the at least one first hole on the first substrate is located within an orthographic projection of the detection area on the first substrate.

15. The microfluidic chip according to claim 12, wherein:

the first substrate structure comprises a fluid reservoir area configured to store droplets and connected to one of the plurality of pin areas; and the second substrate structure is provided with a second hole penetrating the second substrate structure, and an orthographic projection of the second hole on the first substrate at least partially overlaps with an orthographic projection of the fluid reservoir area on the first substrate.

16. The microfluidic chip according to claim 12, wherein the conductive member comprises conductive silver paste.

17. A microfluidic device, comprising the microfluidic chip according to claim 1.

18. A manufacturing method of a microfluidic chip, comprising forming a first substrate structure, wherein forming the first substrate structure comprises:

forming a plurality of pin areas which comprises a first pin area and a second pin area;

forming a detection area comprising:

a plurality of first scan lines extending along a first direction, wherein each first scan line of the plurality of first scan lines is connected to the first pin area through a first scan trace corresponding to each first scan line, a plurality of first data lines extending along a second direction different from the first direction, wherein each first data line of plurality of first data lines is connected to the second pin area through a first data trace corresponding to each first data line, and a plurality of detection units, each of which comprising a first switching transistor, a driving electrode connected to the first switching transistor, and a first hydrophobic layer located above the driving electrode, wherein the first switching transistor is connected to a first scan line of the plurality of first scan lines corresponding to the first switching transistor and connected to a first data line of the plurality of first data lines corresponding to the first switching transistor; and forming a grounding trace surrounding the detection area, connected to at least one of the plurality of detection units and connected to one of the plurality of pin areas.

19. The manufacturing method according to claim 18, further comprising:

forming a second substrate structure, comprising:

providing a second substrate, and forming a common electrode on one side of the second substrate; and engaging the second substrate structure to the first substrate structure through an engagement member, such that the second substrate structure is opposite to the first substrate structure.

20. The manufacturing method according to claim 19, wherein:

forming the second substrate structure further comprises forming a second hydrophobic layer on one side of the common electrode away from the second substrate, wherein the second hydrophobic layer is provided with a hole; and forming the first substrate structure further comprises forming a conductive member connected to the grounding trace, wherein after the second substrate structure is engaged to the first substrate structure, the conductive member passes through the hole to be in contact with the common electrode.

* * * * *